United States Patent
Basnayake et al.

(10) Patent No.: US 9,912,634 B2
(45) Date of Patent: Mar. 6, 2018

(54) ENHANCING DNS AVAILABILITY

(71) Applicant: General Motors LLC, Detroit, MI (US)

(72) Inventors: Chaminda Basnayake, Ruthven (CA); Scott T. Droste, West Bloomfield, MI (US); David George, Farmington Hills, MI (US)

(73) Assignee: General Motors LLC, Detroit, MI (US)

( * ) Notice: Subject to any disclaimer, the term of this patent is extended or adjusted under 35 U.S.C. 154(b) by 336 days.

(21) Appl. No.: 14/656,060

(22) Filed: Mar. 12, 2015

(65) Prior Publication Data

US 2016/0269356 A1    Sep. 15, 2016

(51) Int. Cl.
| | |
|---|---|
| *H04L 29/12* | (2006.01) |
| *H04L 29/08* | (2006.01) |
| *H04W 4/04* | (2009.01) |
| *H04W 84/00* | (2009.01) |

(52) U.S. Cl.
CPC ...... *H04L 61/2015* (2013.01); *H04L 61/1511* (2013.01); *H04L 67/12* (2013.01); *H04W 4/046* (2013.01); *H04W 84/005* (2013.01)

(58) Field of Classification Search
CPC ... H04W 88/08; H04W 48/20; H04W 76/021; H04W 76/022; H04W 67/141; H04W 4/046; H04W 84/005; H04L 61/1511; H04L 67/18; H04L 67/12; H04L 61/2015; H04L 61/6054
See application file for complete search history.

(56) References Cited

U.S. PATENT DOCUMENTS

| | | | | |
|---|---|---|---|---|
| 7,904,569 | B1* | 3/2011 | Gelvin | H04L 67/12 701/31.4 |
| 2007/0253377 | A1* | 11/2007 | Janneteau | H04L 29/12066 370/338 |
| 2008/0102854 | A1* | 5/2008 | Yi | H04L 29/12283 455/456.1 |
| 2008/0112362 | A1* | 5/2008 | Korus | H04L 29/12811 370/331 |
| 2008/0194246 | A1* | 8/2008 | Klein | H04W 8/082 455/422.1 |
| 2009/0070488 | A1* | 3/2009 | Bruenner | H04L 61/2015 709/245 |
| 2009/0313384 | A1* | 12/2009 | Baratakke | H04L 29/12066 709/245 |

(Continued)

*Primary Examiner* — Sargon Nano
(74) *Attorney, Agent, or Firm* — David Willoughby; Reising Ethington P.C.

(57) ABSTRACT

A system and method for providing an address for a Domain Name System (DNS) server to a consumer device, wherein the consumer device connects to the Internet through a vehicle, includes providing an address for a default DNS server to the consumer device; receiving a request from the consumer device to convert a domain name to an Internet Protocol (IP) address using the default DNS server; forwarding the request to the default DNS server; determining if the request has been resolved by the default DNS server within a time-to-respond limit; and updating the consumer device with a different address for a DNS server retrieved from a list stored in vehicle hardware if the request has not been resolved within the time-to-respond limit.

11 Claims, 2 Drawing Sheets

(56) References Cited

U.S. PATENT DOCUMENTS

| | | | |
|---|---|---|---|
| 2011/0295940 A1* | 12/2011 | Saleem | H04L 29/12066 709/203 |
| 2015/0215276 A1* | 7/2015 | Bhagwat | H04L 61/2015 709/220 |
| 2016/0056975 A1* | 2/2016 | Marin | H04L 69/161 709/220 |
| 2016/0099961 A1* | 4/2016 | Paugh | H04L 63/1425 726/23 |
| 2017/0237706 A1* | 8/2017 | Wei | H04L 61/2557 370/392 |

* cited by examiner

ENHANCING DNS AVAILABILITY

TECHNICAL FIELD

The present invention relates to connecting a consumer device to the Internet through a vehicle, and more particularly, to increasing the speed and reliability of that Internet connection.

BACKGROUND

Most vehicles are now equipped with hardware, such as a telematics unit, that enables a variety of wireless communications, including connecting a consumer device to the Internet. The telematics unit is able to act as wireless access point between the consumer device and a wireless carrier system (e.g., a cellular network) that provides access to the Internet.

Devices that connect to the Internet use a numerical Internet Protocol (IP) address to route a request from the consumer device to a particular server that hosts the site on the Internet. The request from the device, however, is generally in a human-readable domain name format (e.g., www.xxx.com), which cannot be directly read by computers. To resolve this format discrepancy, a Domain Name System (DNS) protocol is used to translate a user-friendly domain name into an IP address—a process referred to as DNS name resolution. This process utilizes DNS servers, which manage massive databases that map domain names to IP addresses. In practice, when a consumer device such as a computer on a home network connects to an Internet Service Provider (ISP), or through a WiFi network, the modem or router that assigns the device's network address also provides configuration data including one or more DNS servers that the device uses to translate DNS names to IP addresses.

Similarly, when connecting a consumer device to the Internet through a vehicle, the vehicle's hardware is generally pre-loaded with a default DNS server to be used by the consumer device. However, if the default DNS server stored in the vehicle's hardware is no longer valid or is otherwise unavailable, the consumer device is unable to connect to the Internet causing delays and poor performance.

SUMMARY

According to an embodiment of the invention, there is provided a method for providing an address for a Domain Name System (DNS) server to a consumer device, wherein the consumer device connects to the Internet through a vehicle. The method includes providing an address for a default DNS server to the consumer device; receiving a request from the consumer device to convert a domain name to an Internet Protocol (IP) address using the default DNS server; forwarding the request to the default DNS server; determining if the request has been resolved by the default DNS server within a time-to-respond limit; and updating the consumer device with a different address for a DNS server retrieved from a list stored in vehicle hardware if the request has not been resolved within the time-to-respond limit.

According to another aspect of the invention, there is provided a method for providing an address for a Domain Name System (DNS) server to a consumer device, wherein the consumer device connects to the Internet through a vehicle. The method includes providing an address for a default DNS server and a lease time to the consumer device via dynamic host configuration protocol (DHCP); receiving a request from the consumer device to convert a domain name to an Internet Protocol (IP) address using the default DNS server; maintaining a list of DNS servers in the vehicle hardware, wherein the DNS servers are ranked according to performance characteristics; and updating the consumer device via DHCP with a different address for a DNS server retrieved from the list.

According to yet another aspect of the invention, there is provided a system for connecting a consumer device to the Internet and for providing an address for a Domain Name System (DNS) server to the consumer device. The system includes vehicle hardware and/or a vehicle telematics unit individually or in combination configured to provide an address for a default DNS server and a lease time to the consumer device via dynamic host configuration protocol (DHCP); receive a request from the consumer device to convert a domain name to an Internet Protocol (IP) address using the default DNS server; maintain a list of DNS servers in the vehicle hardware, wherein the DNS servers are ranked according to performance characteristics; and update the consumer device via DHCP with a DNS server retrieved from the list.

BRIEF DESCRIPTION OF THE DRAWINGS

One or more embodiments of the invention will hereinafter be described in conjunction with the appended drawings, wherein like designations denote like elements, and wherein.

DETAILED DESCRIPTION OF THE ILLUSTRATED EMBODIMENT(S)

The system and method described below pertain to connecting a consumer device to the Internet through a vehicle, and in particular, through vehicle hardware acting as a wireless access point. The disclosed method optimizes Domain Name System (DNS) server availability and domain name resolution time by retaining in the vehicle hardware DNS server performance information and by using that information to rank entries in a DNS server list. Further, the method utilizes a dynamic host configuration protocol (DHCP) to continually update the consumer device with the highest ranked DNS server in the DNS server list.

Communications System—

Figure 1:
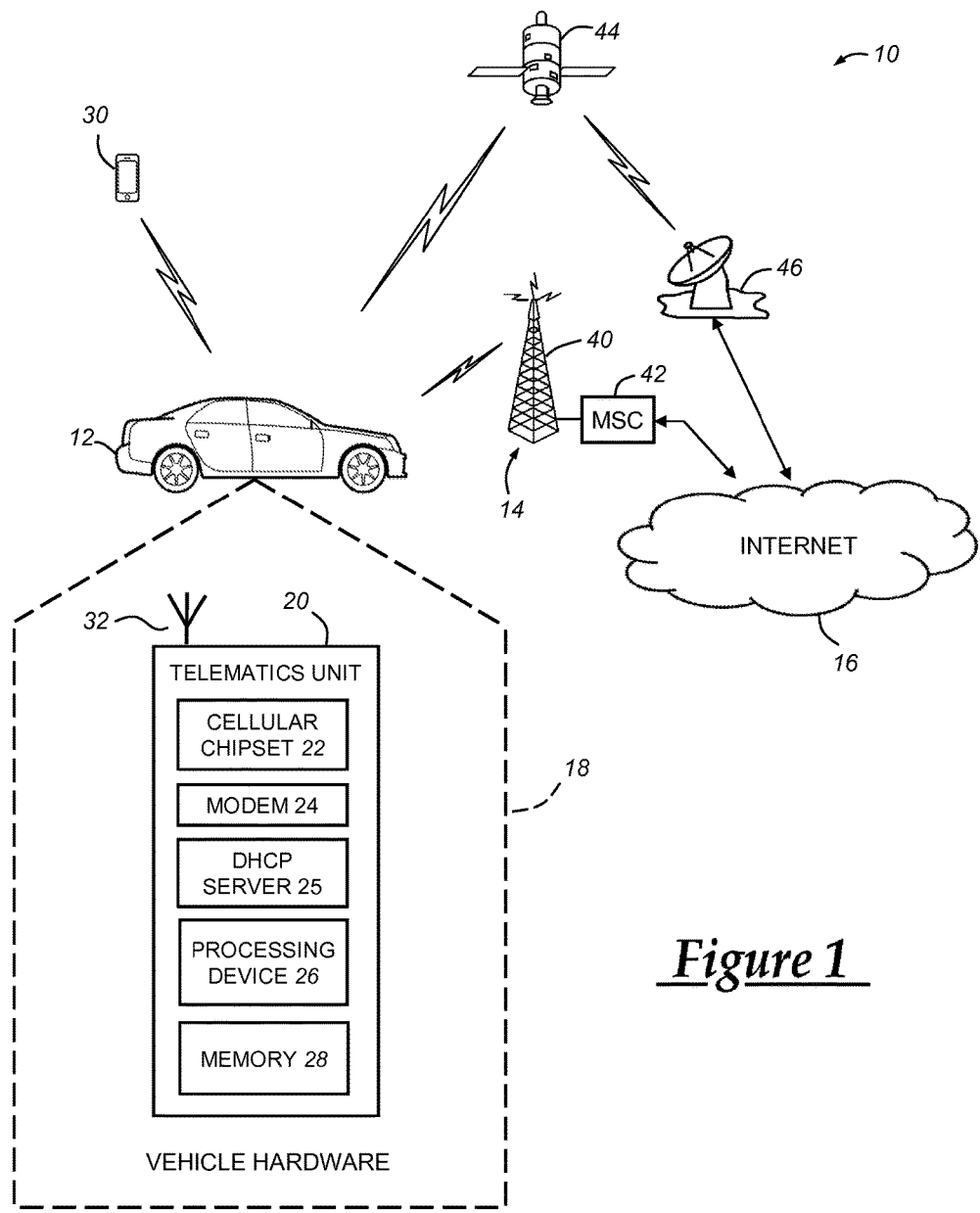
FIG. 1 is a block diagram depicting an embodiment of a communications system that is capable of utilizing the method disclosed herein.

With reference to FIG. 1, there is shown an operating environment that comprises a mobile vehicle communications system 10 that can be used to implement the method disclosed herein. Communications system 10 generally includes a vehicle 12, one or more wireless carrier systems 14, and Internet 16. It should be understood that the disclosed method can be used with any number of different systems and is not specifically limited to the operating environment shown here. Also, the architecture, construction, setup, and operation of the system 10 and its individual components are generally known in the art. Thus, the following paragraphs simply provide a brief overview of one such communications system 10; however, other systems not shown here could employ the disclosed method as well.

Vehicle 12 is depicted in the illustrated embodiment as a passenger car, but it should be appreciated that any other vehicle including motorcycles, trucks, sports utility vehicles (SUVs), recreational vehicles (RVs), marine vessels, aircraft, etc., can also be used. Vehicle hardware 18 is shown generally in FIG. 1 and includes a telematics unit 20, which can be an OEM-installed (embedded) or an aftermarket device that is installed in the vehicle and that enables wireless voice and/or data communication over wireless carrier system 14 and via wireless networking. This enables the vehicle 12 to communicate with a vehicle call center (not shown), other telematics-enabled vehicles, or some other entity or device, such as a consumer device 30. The telematics unit 20 preferably uses radio transmissions to establish a communications channel (a voice channel and/or a data channel) with wireless carrier system 14 so that voice and/or data transmissions can be sent and received over the channel. By providing both voice and data communication, telematics unit 20 enables the vehicle to offer a number of different services including those related to navigation, telephony, emergency assistance, diagnostics, infotainment, etc. Data can be sent either via a data connection, such as via packet data transmission over a data channel, or via a voice channel using techniques known in the art. For combined services that involve both voice communication and data communication, the system can utilize a single call over a voice channel and switch as needed between voice and data transmission over the voice channel, and this can be done using techniques known to those skilled in the art.

According to one embodiment, telematics unit 20 utilizes cellular communication according to either GSM, CDMA, or LTE standards and thus includes a standard cellular chipset 22 for voice communications like hands-free calling, a wireless modem for data transmission 24, a dynamic host configuration protocol (DHCP) server 25, an electronic processing device 26, one or more digital memory devices 28 including volatile and non-volatile memory, and a dual antenna 32. It should be appreciated that the modem 24 can either be implemented through software that is stored in the telematics unit 20 and is executed by processor 26, or it can be a separate hardware component located external to telematics unit 20. The modem 24 can operate using any number of different standards or protocols such as LTE, EVDO, CDMA, GPRS, and EDGE. Wireless networking between the vehicle and other networked devices (including consumer device 30) can also be carried out using telematics unit 20. For this purpose, telematics unit 20 can be configured to communicate wirelessly according to one or more wireless protocols, including short range wireless communication (SRWC) such as any of the IEEE 802.11 protocols, WiMAX, ZigBee™, Wi-Fi direct, Bluetooth, or near field communication (NFC). When used for packet-switched data communication such as TCP/IP, the telematics unit 20 can be configured with a static IP address or can be set up to automatically receive an assigned IP address from another device on the network such as a router or from a network address server, such as DHCP server 25.

DHCP adopts a client/server model, wherein upon connecting to a network a DHCP client sends a request to a DHCP server, which manages a pool of IP addresses and configuration parameters. In response to the request from the DHCP client, the DHCP server grants the request and returns the corresponding configuration information including an IP address and an address for a DNS server. This request-and-grant process uses a lease concept having a configurable time period for which the allocation of the IP address is valid. This process allows the DHCP server to reclaim and then reallocate IP addresses and update DNS servers that are not renewed at the expiration of the lease time.

The DHCP request-and-grant process generally includes four phases to dynamically obtain an IP address from the DHCP server: the discover phase; the offer phase; the select phase; and the acknowledge phase. Referring to FIG. 1, in the discover phase, the DHCP client, in this case consumer device 30, broadcasts a DHCP-DISCOVER packet to the DHCP server 25. In the offer phase, after receipt of the DHCP-DISCOVER packet, DHCP server 25 chooses an unassigned IP address according to a priority order of IP address assignments and then sends a DHCP-OFFER packet to the consumer device 30, which includes the IP address and other configuration information such as the lease time and an address for a DNS server. DNS servers manage large databases that map domain names to IP addresses. While undetected by a user, when the consumer device 30 attempts to connect to a particular site on the Internet (e.g., www.google.com), a DNS request is sent from the consumer device 30 to a DNS server requesting an IP address that corresponds to that particular domain name. The DNS server maps the domain name and returns to the consumer device 30 a corresponding IP address for the requested site (e.g., 173.194.115.10). In one embodiment, the DNS server provided in the OFFER phase is a default DNS server address stored in memory 28.

In the select phase, the consumer device 30 selects the IP address and then broadcasts a DHCP-REQUEST packet containing the assigned IP address and DNS server address carried in the DHCP-OFFER packet. In the acknowledge phase, upon receiving the DHCP-REQUEST packet, DHCP server 25 returns a DHCP-ACK packet to consumer device 30 to confirm the assignment of the IP address and the DNS server. After the DHCP server 25 dynamically assigns the IP address to consumer device 30, the IP address remains valid for the specified lease time and will be reclaimed by the DHCP server 25 when the lease expires. If the consumer device 30 wants to use the IP address for a longer time, consumer device 30 must update the IP lease. Generally, by default the consumer device 30 will update the IP address lease automatically by unicasting a DHCP-REQUEST packet to the DHCP server 25 when half of the lease time elapses. The DHCP server 25 responds with a DHCP-ACK packet to notify the consumer device 30 of a new lease if the server is able to re-assign the same IP address to the client. Otherwise, the DHCP server 25 responds with a DHCP-NAK packet to notify the consumer device 30 that the IP address will be reclaimed when the lease time expires. As set forth below, this lease renew process can also be used to update the DNS server to the consumer device 30.

Processor 26 can be any type of device capable of processing electronic instructions including microprocessors, microcontrollers, host processors, controllers, vehicle communication processors, and application specific integrated circuits (ASICs). Processor 26 can be a dedicated processor used only for telematics unit 20 or can be shared with other vehicle systems. Processor 26 executes various types of digitally-stored instructions, such as software or firmware programs stored in memory 28, which enable the telematics unit 20 to provide a wide variety of services. For instance, processor 26 can execute programs or process data to carry out at least a part of the method discussed herein.

Memory device 28 includes both volatile and non-volatile memory. In one embodiment, the non-volatile memory of device 28 stores a list of DNS servers utilized by the vehicle hardware 18 when connecting the consumer device 30 to the Internet through the vehicle 12. The entries in DNS server list are continuously updated and ranked based upon criteria such as prior DNS server performance characteristics (e.g., DNS resolution time) and other information provided by wireless carrier system 14.

Wireless carrier system 14 is preferably a cellular telephone system that includes a plurality of cell towers 40 (only one shown), one or more mobile switching centers (MSCs) 42, as well as any other networking components required to connect wireless carrier system 14 with Internet 16. Each cell tower 40 includes sending and receiving antennas and a base station, with the base stations from different cell towers being connected to the MSC 42 either directly or via intermediary equipment such as a base station controller. Cellular system 14 can implement any suitable communications technology, including for example, analog technologies such as AMPS, or the newer digital technologies such as CDMA (e.g., CDMA2000) or GSM/GPRS. As will be appreciated by those skilled in the art, various cell tower/base station/MSC arrangements are possible and could be used with wireless system 14. For instance, the base station and cell tower could be co-located at the same site or they could be remotely located from one another, each base station could be responsible for a single cell tower or a single base station could service various cell towers, and various base stations could be coupled to a single MSC, to name but a few of the possible arrangements.

Apart from using wireless carrier system 14, a different wireless carrier system in the form of satellite communication can be used to provide uni-directional or bi-directional communication with the vehicle. This can be done using one or more communication satellites 44 and an uplink transmitting station 46. Uni-directional communication can be, for example, satellite radio services, wherein programming content (news, music, etc.) is received by transmitting station 46, packaged for upload, and then sent to the satellite 44, which broadcasts the programming to subscribers. Bi-directional communication can be, for example, satellite telephony services using satellite 44 to relay telephone communications between the vehicle 12 and station 46. If used, this satellite telephony can be utilized either in addition to or in lieu of wireless carrier system 14.

Internet 16 is a global infrastructure of interconnected computer networks that use the standard Internet protocol suite (TCP/IP) to link billions of devices worldwide. Internet 16 is an international network of networks that consists of millions of private, public, academic, business, and government packet switched networks linked by a broad array of electronic, wireless, and optical networking technologies. These computer networks are accessible through the vehicle 12 via telematics unit 20 and wireless carrier system 14 and include, but are not limited to, all servers that host websites, proprietary servers, and DNS servers.

The operating environment may further include one or more consumer devices (CDs) 30. In one embodiment, the consumer device 30 may be an electronic device used to make mobile telephone calls across a wide geographic area where transmissions are facilitated by the wireless carrier system 14 (i.e., when the consumer device 30 is connected to the wireless carrier system 14 through the telematics unit 20).

The consumer device 30 may include: hardware, software, and/or firmware enabling cellular telecommunications and communications via short-range wireless communication (e.g., Wi-Fi Direct and Bluetooth) as well as other mobile consumer device applications. Such device applications may include software applications, which may be preinstalled or installed by the user. One commercial implementation of a vehicle-mobile device application may be RemoteLink™, enabling a vehicle user to communicate with the vehicle 12 and/or control various aspects or functions of the vehicle—e.g., among other things, allowing the user to remotely lock/unlock vehicle doors, turn the vehicle On/Off, check the vehicle tire pressures, fuel level, oil life, etc.

The hardware of the consumer device 30 may have electronics known to skilled artisans including a communication interface(s), an antenna, etc. In addition, modern consumer devices 30 may also support additional services and/or functionality such as short messaging service (SMS or texts), multimedia messaging service (MMS), email, internet access, as well as business and gaming applications. Non-limiting examples of the consumer device 30 include a mobile cellular telephone, a personal digital assistant (PDA), a Smart Phone, a tablet, a personal laptop computer having two-way communication capabilities, a netbook computer, or any suitable combinations thereof. The consumer device 30 may be used inside or outside of a vehicle (such as the vehicle 12 shown in FIG. 1), and may be coupled to the vehicle by wire or wirelessly (e.g., using short range wireless communication). The consumer device 30 also may be configured to provide services according to a subscription agreement with a third-party facility or wireless/telephone service provider. It should be appreciated that various service providers may utilize the wireless carrier system 14 and that the service provider of the telematics unit 20 may not necessarily be the same as the service provider of the consumer device 30.

The consumer device 30 and the vehicle 12 may be used together by a person known as the vehicle user such as the driver. However, the vehicle user does not need to be the driver of the vehicle 12 nor does the vehicle user need to have ownership of the consumer device 30 or the vehicle 12 (e.g., the vehicle user may be an owner or a licensee of either or both).

Method—

Figure 2:
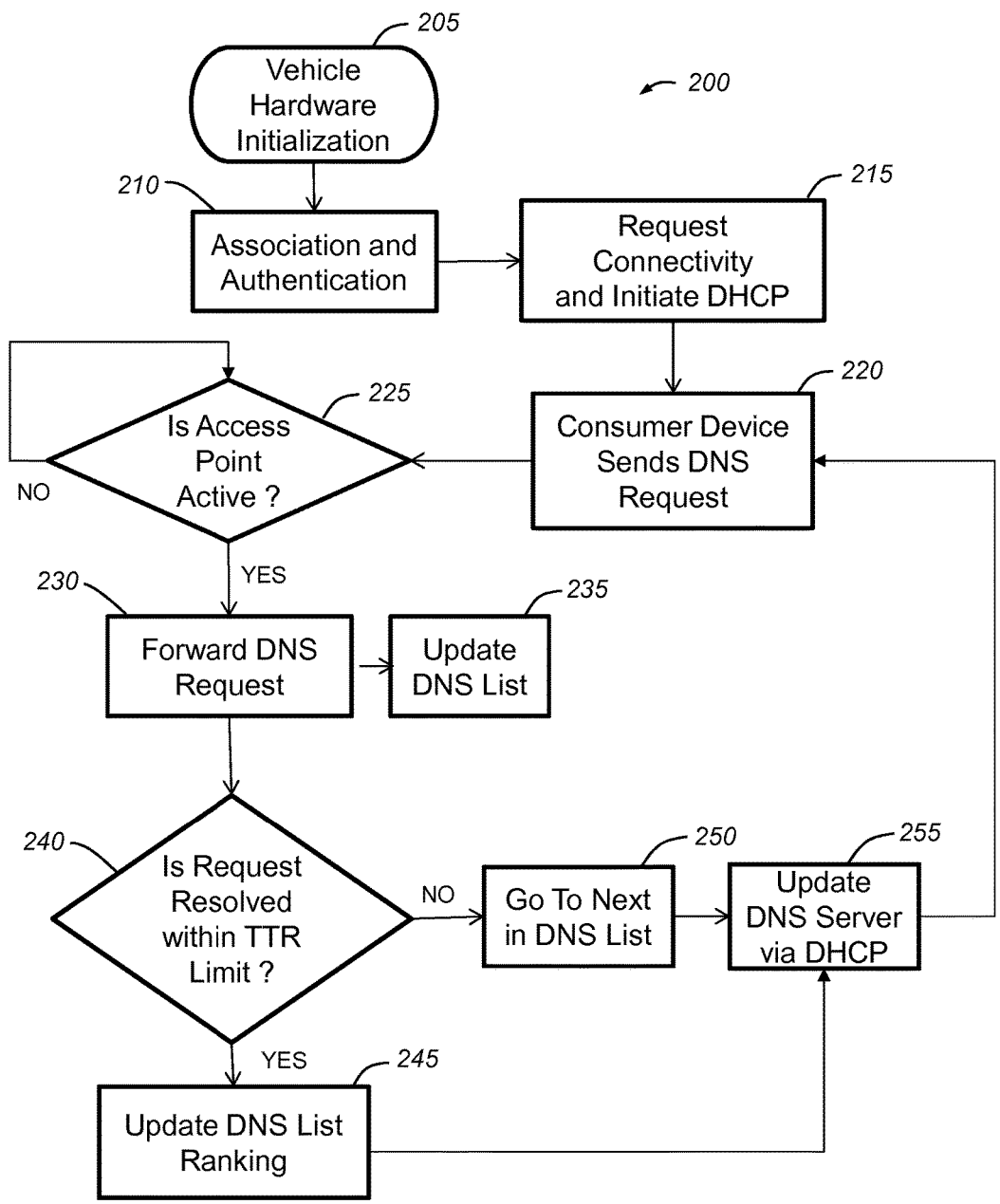
FIG. 2 is a flow chart depicting a method for enhancing DNS availability according to an embodiment of the disclosed invention.

Turning now to FIG. 2, there is a method for connecting a consumer device 30 to the Internet through a vehicle 12, and in particular, for optimizing DNS server availability and resolution time according to the following exemplary embodiment. The method 200 begins at step 205 with the initialization of the vehicle hardware 18 including telematics unit 20. This initialization may include a boot-up process where data stored in memory 28 is read by processing device 26. The retrieved data may include a default DNS server address used by the consumer device 30 for domain name resolution, as described below.

At step 210 a secure short-range wireless communication is established between the vehicle hardware 18, and in one particular example the telematics unit 20, and one or more nearby consumer devices 30, thereby linking the consumer device with the vehicle 12. The telematics unit 20 and the consumer device 30 can communicate with each other via any suitable short-range wireless communication technology using a standardized protocol, such as Bluetooth or others, some of which have been listed above. In one non-limiting example, the consumer device 30 and the vehicle telematics unit 20, acting here as a wireless access point, utilize the association and authentication process set forth in IEEE 802.11 to establish connectivity. In brief, the consumer device 30 and the telematics unit 20 exchange a series of management frames in order to get to an authenticated and associated state between the consumer device 30 and the telematics unit 20.

In another embodiment, the telematics unit 20 may also be linked or paired to a software application ("app") installed on the consumer device 30. After an initial linking or pairing to the telematics unit 20, the app on the consumer device 30 may automatically communicate with the telematics unit 20 through any suitable wireless communications technology as set forth above, or there may be an authentication mechanism such as requiring a password or other identifying information prior to connection with the telematics unit 20.

At step 215, the vehicle telematics unit 20 requests data connectivity with wireless carrier system 14 and initiates a dynamic host configuration protocol (DHCP) to establish data communication between the vehicle telematics unit 20 and the consumer device 30, and ultimately, the Internet. Telematics unit 20 has a preconfigured carrier profile that it uses to register with a preferred wireless carrier. Telematics unit 20 also has the ability to store more than one wireless carrier profile. Therefore, it is possible to change the preferred carrier if needed using remote functions. Furthermore, if signals from the preferred carrier are not available, telematics unit 20 may choose to register with a carrier that has a service agreement with the preferred carrier. This functionality is identical to that of a wireless mobile phone carrier. As described above, DHCP employs a request-and-grant process wherein the DHCP server 25 provides configuration information to consumer device 30, including an IP address and a DNS server address. In one embodiment, the initial DNS server address provided to the consumer device 30 refers to the default DNS server read from memory 28 upon initialization of the vehicle hardware 18 in step 205. As part of the DHCP process, the DHCP 25 designates a lease time for which the consumer device 30 may utilize the IP address and default DNS server. As understood by one skilled in the art, the lease time is configurable and may vary, but in at least one example, the initial lease time may be 60 seconds. In general, the consumer device 30 will begin to initiate a request to renew or initiate a new lease, as set forth in further detail below.

At step 220, the consumer device 30 sends a DNS request to the default DNS server via telematics unit 20. Prior to forwarding the DNS request, at step 225 telematics unit 20 determines if the connection to the Internet through the wireless carrier system 14 is active. If the connection is not active, telematics unit 20 waits until the connection is active, then forwards the DNS request at step 230 to the default DNS server.

At step 235 the DNS list stored in memory 28 is updated to ensure that the default DNS server retrieved at step 205 is included as one of the entries in the DNS list. However, one of ordinary skill in the art appreciates that the DNS list is continually updated while the connectivity between the vehicle hardware 18 and the wireless carrier system 14 is active. For example, when data connectivity is requested at step 215, a variety of information utilized by the vehicle hardware 18 is returned in response to the request, including new DNS servers. However, the response from the wireless carrier system 14 may not be immediate and may not be received by the vehicle hardware 18 until after the DNS request is forwarded at step 230 using the address for the default DNS server. Consequently, new updated DNS server information may be received by the vehicle hardware 18 while the DNS request is being processed, but cannot be forwarded to the consumer device 30 until the consumer device 30 communicates with the telematics unit to renew the current lease, which is explained in greater detail below. Nonetheless, the DNS list, and the ranking of the entries in the DNS list, is continually being updated in the background. The ranking of each entry in the list is based on historical and current performance characteristics such as prior connection success rate, domain name resolution time, etc. Monitored performance characteristics will be success rate, time to respond, and time since the most recent use. Use criteria can be any combination of the above factors.

Referring back to step 230, the vehicle hardware 18 tracks the DNS request using a timer that starts when the DNS request is sent and records the amount of time that it takes for the DNS server to successfully resolve the domain name. This timing information is used to rank the entries in the DNS list. The timing function is also used to determine if the DNS request has been resolved within a predetermined time-to-resolve (TTR) limit. At step 240, the system determines if the DNS request has been resolved within the TTR limit. If the DNS request has been resolved, at step 245 the DNS list is updated to reflect the resolution time for the current DNS server and the DNS list ranking is updated accordingly. If the TTR limit has expired and the DNS request has not been resolved, at step 250 the next available, highest ranked server in the DNS list is queued for transmission to the consumer device 30 via DHCP.

In most cases, the consumer device 30 acting as the DHCP client is configured to automatically update the lease by unicasting a DHCP-REQUEST packet to the DHCP server 25 when half of the lease time elapses. In other words, whether the default DNS server used in step 230 is successful in resolving the domain name, or whether the TTR limit expired and a new DNS server is in the queue according to step 250, when approximately half of the lease time has elapsed, at step 255 the consumer device 30 issues the DHCP-REQUEST packet such that the DNS server may be updated with the next server in the DNS list and a new lease time assigned. In this way, the most up-to-date efficient DNS server is always being utilized by the system. In one scenario, the default DNS server, or otherwise current DNS server, may already be the highest ranking server in the DNS list. In this case, the DHCP server 25 may respond with a DHCP-ACK packet to acknowledge receipt of the request and to assign a new lease time to the default and/or current DNS server.

It is to be understood that the foregoing is a description of one or more embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

What is claimed is:

1. A method for providing an address for a Domain Name System (DNS) server to a consumer device, wherein the consumer device connects to the Internet through a vehicle, the method comprising the steps of:

providing an address for a default DNS server and a lease time to the consumer device via a dynamic host configuration protocol (DHCP) using a vehicle DHCP server;

receiving a request from the consumer device to convert a domain name to an Internet Protocol (IP) address using the default DNS server;

maintaining a list of DNS servers in the vehicle hardware, wherein the DNS servers are ranked according to performance characteristics, wherein maintaining the list includes monitoring the performance characteristics of the DNS servers and updating the rankings of the DNS servers based on the monitored performance characteristics; and using the vehicle DHCP server, updating the consumer device via DHCP with a different address for a DNS server retrieved from the list when the address for the default DNS server is not valid or when the default DNS server is unavailable to process the request.

2. The method of claim 1, further including adding to the list one or more DNS servers received from a wireless carrier system.

3. The method of claim 1, wherein updating the consumer device with the DNS server address includes retrieving from the list the highest ranking DNS server entry in the list.

4. The method of claim 1, wherein the performance characteristics for each DNS server in the list include domain name resolution time.

5. The method of claim 1, further including updating the DNS server entries in the list when a new entry is received, when new performance information is available, or both.

6. The method of claim 1, further including receiving a request to update the consumer device via DHCP when half of the lease time has elapsed.

7. A system for connecting a consumer device to the Internet and for providing an address for a Domain Name System (DNS) server to the consumer device, the system comprising:

vehicle hardware, a vehicle telematics unit, or both, individually or in combination configured to:

provide an address for a default DNS server and a lease time to the consumer device via dynamic host configuration protocol (DHCP);

receive a request from the consumer device to convert a domain name to an Internet Protocol (IP) address using the default DNS server;

maintain a list of DNS servers in the vehicle hardware, wherein the DNS servers are ranked according to performance characteristics, and wherein maintaining the list includes monitoring the performance characteristics of the DNS servers and updating the rankings of the DNS servers based on the monitored performance characteristics; and update the consumer device via DHCP with a DNS server retrieved from the list when the address for the default DNS server is not valid or when the default DNS server is unavailable to process the request.

8. The system of claim 7, wherein updating the consumer device with the DNS server address includes retrieving from the list the highest ranking DNS server entry in the list.

9. The system of claim 7, wherein the performance characteristics for each DNS server in the list include domain name resolution time.

10. The system of claim 7, further including updating the DNS server entries in the list when a new entry is received, when new performance information is available, or both.

11. The system of claim 7, further including receiving a request to update the consumer device via DHCP when half of the lease time has elapsed.

\* \* \* \* \*